(12) United States Patent
Nettesheim

(10) Patent No.: US 6,346,323 B1
(45) Date of Patent: Feb. 12, 2002

(54) MULTI-LAYER SYNTHETIC FILM

(75) Inventor: Stefan Nettesheim, Zürich (CH)

(73) Assignee: SIG Pack Systems AG, Beringen (CH)

( * ) Notice: Subject to any disclaimer, the term of this patent is extended or adjusted under 35 U.S.C. 154(b) by 0 days.

(21) Appl. No.: 09/675,128

(22) Filed: Sep. 29, 2000

(30) Foreign Application Priority Data

Oct. 7, 1999 (CH) .............................................. 1835/99

(51) Int. Cl.⁷ ................................................. B32B 5/16
(52) U.S. Cl. ...................... 428/333; 428/349; 428/34.6; 428/36.91; 428/332
(58) Field of Search ....................... 156/272.4; 428/36.7, 428/40.02, 34.7, 35.2, 35.4, 36.91, 349, 34.6, 332, 333, 346; 427/536

(56) References Cited

U.S. PATENT DOCUMENTS 5,635,011 A * 6/1997 Rosen ..................... 156/272.4
5,811,185 A * 9/1998 Schreck et al. ............. 428/349
5,840,146 A   11/1998 Woo et al.

FOREIGN PATENT DOCUMENTS

| DE | 38 13 570 | 11/1989 |
| JP | 1014979 | 1/1999 |
| JP | 2000238835 | 9/2000 |
| WO | 97/02948 | 1/1997 |

* cited by examiner

Primary Examiner—Merrick Dixon
(74) Attorney, Agent, or Firm—Venable; Gabor J. Kelemen

(57) ABSTRACT

A multilayer synthetic packaging film includes an at least partially transparent carrier layer having opposite first and second faces and a light-absorbing absorption layer applied to the first face of the carrier layer and having a maximum thickness of 10 micron.

18 Claims, 2 Drawing Sheets

MULTI-LAYER SYNTHETIC FILM

CROSS-REFERENCE TO RELATED APPLICATION

This application claims the priority of Swiss Application No. 1835/99 filed Oct. 7, 1999, which is incorporated herein by reference.

BACKGROUND OF THE INVENTION

Multi-layer films made of synthetic material for packaging various products are well known in the art. Such films are composed of at least one carrier film—which may be provided with a printed message—and a hot sealing layer. By a layered combination of base materials having different properties a composite film may be obtained which has a property profile that is superior to films consisting of a single layer.

As disclosed in U.S. Pat. No. 5,811,185, for the conventional sealing processes performed with electrically heated sealing shoes, particularly the combination of a first-melting layer (sealing layer) with a mechanically and thermally stable carrier layer is of importance. The manufacture of such composite films of different polymer materials is, however, complex and expensive. In the alternative, high-frequency, induction and light sealing processes have been used. In each of these processes one part of the electromagnetic energy must be absorbed by the composite film. In the high-frequency sealing process such a result is achieved by the selection of the polymer materials having a sufficiently high dielectric loss factor, as disclosed in U.S. Pat. No. 5,840,146. Similarly, electrically conducting layers are needed for the induction sealing process, as disclosed in U.S. Pat. No. 5,635,011. Composite profiles having metallic or at least electrically conducting layers are, however, expensive to make and are not desirable in all cases of application. For the light sealing process pigments or dyes are added to the film material for reinforcing the optical absorption, as discussed in German Offenlegungsschrift (application published without examination) U.S. Pat. No. 3,813,570. The sealing process disclosed in this patent document and the films used therefor, however, are not adapted for providing transverse sealing seams on wrapper sleeves made of the film.

SUMMARY OF THE INVENTION

It is an object of the invention to provide an improved multi-layer synthetic film which makes possible an efficient sealing and is also adapted to receive transverse sealing seams thereon.

This object and others to become apparent as the specification progresses, are accomplished by the invention, according to which, briefly stated, the multilayer synthetic packaging film includes an at least partially transparent carrier layer having opposite first and second faces and a light-absorbing absorption layer applied to the first face of the carrier layer and having a maximum thickness of 10 micron.

According to further advantageous features of the invention, the absorption layer is a thermoplastic material and further, on that face of the absorption layer which is oriented away from the carrier layer, a thermoplastic sealing layer is provided. The total thickness of the absorption layer and the sealing layer is 10 micron at the most. Such a construction makes possible a particularly efficient sealing of two films with one another. Since only a total layer thickness of maximum 2×10 micron is heated, such a heating occurs very rapidly. Since, during this occurrence the two carrier layers remain cool, the tension strength weakens only slightly during the sealing process. Further, an efficient heat removal occurs in these layers subsequent to the sealing process so that the sealing seam solidifies very rapidly and thus the full strength of the seam is rapidly reached. Also, extraordinarily short sealing times are obtained. Because the carrier layer remains cool, it does not need to have a higher melting temperature than the sealing layer and it does not adhere to the sealing shoes or guide elements which press the sealing seam during the sealing process. For this reason the composite film may be made in an inexpensive manner from one and the same material, except that the absorption layer should be pigmented or dyed. The absorption layer is preferably at least 50% transparent, that is, the degree of absorption is 50% at the most. As a result, in case of two superposed films, whose sealing layers are oriented toward one another, both sealing layers are simultaneously heated by means of light absorption in the course of an only unilateral irradiation by the light source. In case a degree of absorption of less than 25% is selected, simultaneously two or more superposed film pairs may be sealed with one and the same light pulse. Such a proceeding is advantageous, for example, in case of pinch-folds or folded-over edge zones. The film is adapted to be provided with arbitrarily arranged sealing seams. Thus, it is adapted, for example, to be transversely sealed when in a wrapper sleeve form to function as packaging material.

According to a preferred embodiment of the invention, the film has the following layers: a first transparent layer, a second transparent layer and a dyed or pigmented absorption layer wherein the thickness ratio of the three layers are approximately 4:2:1 and wherein preferably all three layers are made of the same basic material, preferably polyolefin. This construction lends itself particularly well for a co-extrusion process: it has been found that it is relatively difficult to simultaneously extrude a relatively thick carrier layer together with a very thin absorption layer or sealing layer to obtain a conventional composite film.

DESCRIPTION OF THE PREFERRED EMBODIMENTS

Figure 1:
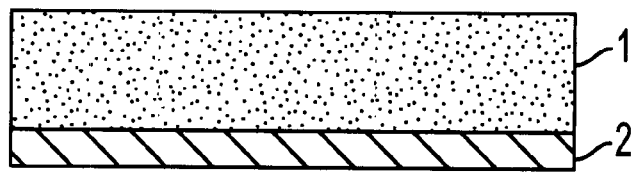
FIGS. 1, 2, 3 and 4 are enlarged sectional views illustrating four preferred embodiments of the invention.
Figure 2:
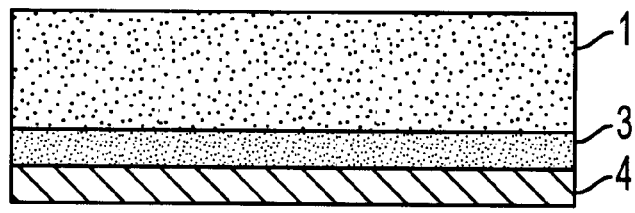
Figure 4:
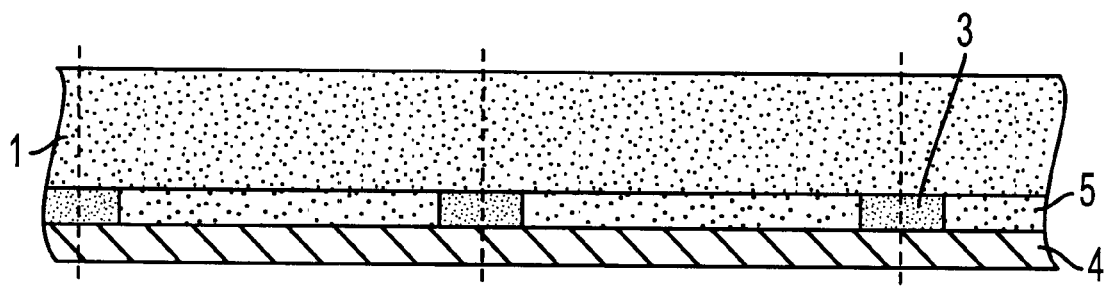
Figure 5:
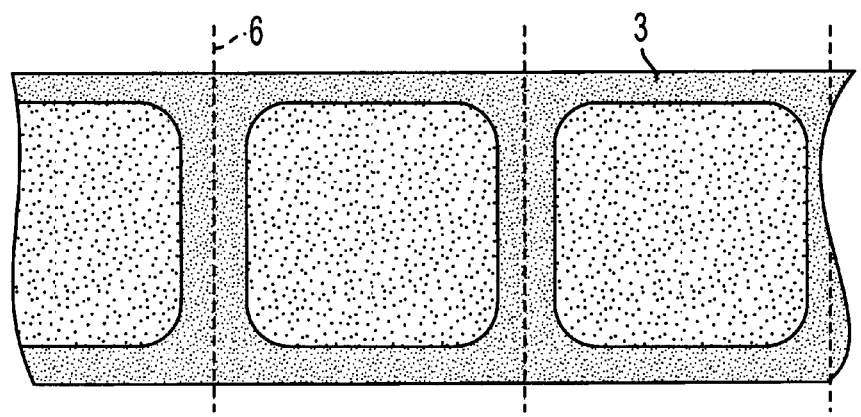
FIG. 5 is a top plan view of the embodiment shown in FIG. 4.

The film shown in FIG. 1 is composed of a transparent thermoplastic carrier layer 1 and a thin, light absorbing, thermoplastic sealing layer 2. The light absorbing properties of the layer 2 may be obtained, for example, by pigmenting or dyeing the material. The pigment may be a substance which is photochemically bleached under the effect of heat and thus the light absorbing layer becomes transparent in the course of the sealing process. In the film according to FIG. 2, that side of the absorption layer 3 which is oriented away from the carrier layer 1 is provided with a separate thermoplastic sealing layer 4. In the embodiments according to FIGS. 4 and 5 the absorption layer 3 is printed on the carrier layer 1 as a pattern provided in a print layer 5. The locations of the transfer sealing seams are designated at 6.

Figure 3:
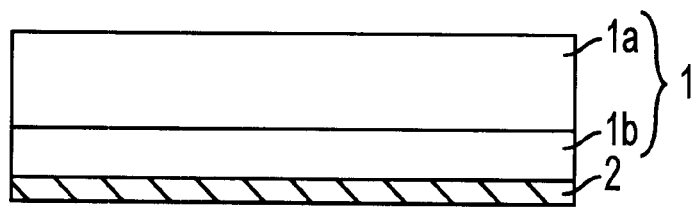

In all four embodiments the thickness of the absorption and sealing layer 2, or as the case may be, the sum of the thickness of the absorption layer 3 and the sealing layer 4 is 10 micron at the most. The degree of absorption, that is the reduction of the light intensity during passage of the light through the layer 2 or 3 is preferably less than 50%, for example between 2 and 20%. In the embodiment according to FIG. 3, the transparent layer 1 is composed of two layers 1a, 1b. The relationship of the thicknesses of the layers 1a, 1b, 2 is approximately 4:2:1. The transparent layer 1 is thus approximately 6 times thicker than the absorption layer 2. By virtue of such a layer structure the co-extrusion of the composite film is facilitated. The layers 1a, 1b may be made, for example, of transparent polyolefin, whereas the layer 2 may be made of a dyed or pigmented polyolefin. In the embodiment according to FIGS. 2 and 4 the sealing layer 4 may be made, for example, of a heat-sealable lacquer which is preferably maximum 6 micron thick.

Figure 6:
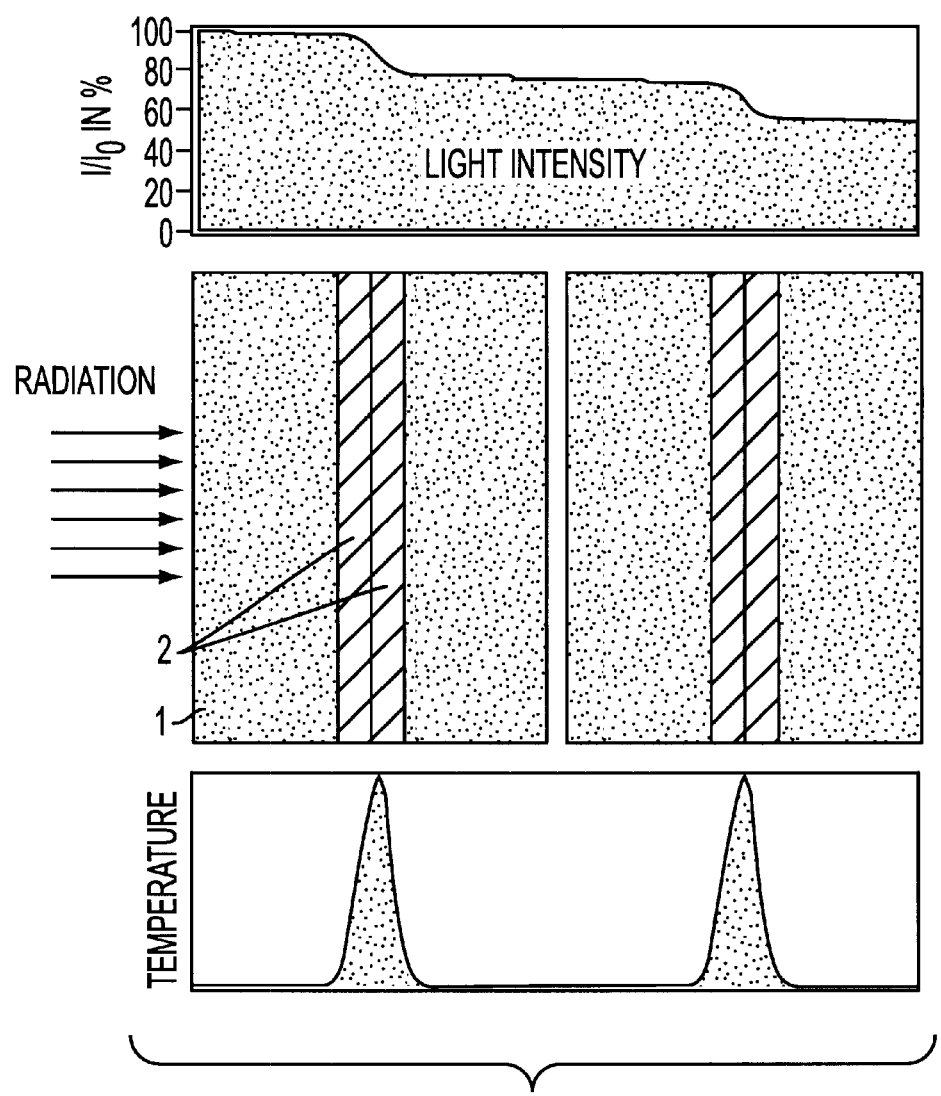
FIG. 6 illustrates diagrams showing the light intensity and temperature distribution during the sealing process.

FIG. 6 shows the reduction of the light intensity and the temperature distribution during passage of the light through two pairs of films (of the structure shown in FIG. 1) to be sealed to one another. The absorption for each layer 2 is approximately 10% so that the layers 2 absorb approximately 40% of the traversing light. Such a small degree of absorption is desired, for example, for sealing pinch-folds in a packing machine where simultaneously two pairs of composite films are to be sealed to one another. There are, however, types of folds where simultaneously four pairs of films are to be sealed together. In the example according to FIG. 6, on that side of the films which is oriented away from the light source a mirror may be positioned. As a result of such an arrangement both sealing seams are identically illuminated and thus heated despite the reduction in the radiation intensity.

It has been surprisingly found that it is not the total energy applied to the composite film which determines the strength of the sealing seam but a relationship heretofore not observed which exists between the optimal duration and intensity of the illumination with electromagnetic radiation and the construction of the absorption and sealing layer. With radiation sources of high intensity (greater than $10^4$ W/cm$^2$) it is feasible to briefly produce a steep temperature radiant in the composite film. For this purpose a pulsed optical sealing apparatus is adapted as described in U.S. patent application Ser. No. 09/494,557, filed Jan. 31, 2000 which is incorporated herein by reference. During the short-period illumination at the beginning of the mechanical sealing process the heat energy remains substantially concentrated in a thin layer. As a departure from conventional heat sealing processes, such a concentration of the heat energy permits the use of a carrier film whose melting behavior is similar to the sealing layer or even melts at lower temperatures. According to the invention, such a procedure may be performed by virtue of the fact that the sum of the thicknesses of the absorption and sealing layer are less than 10 micron. The thickness of the carrier film should be at least twice the total thickness of the absorption and sealing layer. As a result, the required light energy which has to be transformed into heat is significantly reduced and consequently, the mean output of the light source may be reduced and the total degree of absorption of the composite film may be significantly reduced compared to a volume-pigmented film. Since the carrier layer remains substantially cold and is not plasticized, the film retains its tension strength and does not tend to adhere to mechanical guiding and pressing elements of the processing machine. The light-absorbing layer may also be so structured that it absorbs light only in the ultraviolet and/or infrared spectral regions. In the visible spectrum such a film is therefore transparent.

It will be understood that the above description of the present invention is susceptible to various modifications, changes and adaptations, and the same are intended to be comprehended within the meaning and range of equivalents of the appended claims.

What is claimed is:

1. A multilayer synthetic packaging film comprising an at least partially transparent carrier layer having opposite first and second faces and a light-absorbing absorption and sealing layer applied to said first face of said carrier layer; said light-absorbing absorption and sealing layer having a maximum thickness of 10 micron and being heatable by light absorption.

2. The multilayer synthetic packaging film as defined in claim 1, wherein said absorption layer is a thermoplastic material.

3. The multilayer synthetic packaging film as defined in claim 1, wherein said absorption layer has a degree of absorption between 2% and 40%.

4. The multilayer synthetic packaging film as defined in claim 1, wherein said transparent layer is formed of first and second superposed transparent layers and said absorption layer is of a thermoplastic material and is applied to said second transparent layer, whereby said second transparent layer is flanked by said absorption layer and said first transparent layer; further wherein a thickness ratio of said first transparent layer, said second transparent layer and said absorption layer is approximately 4:2:1.

5. The multilayer synthetic packaging film as defined in claim 4, wherein said first transparent layer, said second transparent layer and said absorption layer are of the same material.

6. The multilayer synthetic packaging film as defined in claim 5, wherein said material is polyolefin.

7. The multilayer synthetic packaging film as defined in claim 1, wherein said absorption layer is light-absorbing in one of the ultraviolet range and the infrared range of the optical spectrum and is transparent in the visible range of the optical spectrum.

8. The multilayer synthetic packaging film as defined in claim 1, wherein said absorption layer contains a pigment which is photochemically bleached under the effect of heat.

9. A multilayer synthetic packaging film comprising an at least partially transparent carrier layer having opposite first and second faces, a light-absorbing absorption layer having opposite third and fourth faces; the light-absorbing absorption layer being applied with the third face thereof to said first face of said carrier layer; and a sealing layer being applied to said fourth face of said light-absorbing absorption layer; said sealing layer being heatable by light absorption in said light-absorbing absorption layer.

10. The multilayer synthetic packaging film as defined in claim 9, wherein said sealing layer is a thermoplastic material and wherein said light-absorbing absorption layer and said sealing layer have a combined maximum thickness of 10 micron.

11. The multilayer synthetic packaging film as defined in claim 9, wherein said absorption layer has a degree of absorption between 2% and 40%.

12. The multilayer synthetic packaging film as defined in claim 9, wherein said transparent layer is formed of first and second superposed transparent layers and said absorption layer is of a thermoplastic material and is applied to said second transparent layer, whereby said second transparent layer is flanked by said absorption layer and said first transparent layer; further wherein a thickness ratio of said first transparent layer, said second transparent layer and said absorption layer is approximately 4:2:1.

13. The multilayer synthetic packaging film as defined in claim 12, wherein said first transparent layer, said second transparent layer and said absorption layer are of the same material.

14. The multilayer synthetic packaging film as defined in claim 13, wherein said material is polyolefin.

15. The multilayer synthetic packaging film as defined in claim 9, wherein said absorption layer is printed on said carrier layer and further wherein said sealing layer is a heat-sealable lacquer layer having a thickness of less than 6 micron.

16. The multilayer synthetic packaging film as defined in claim 15, wherein said absorption layer is printed only on parts of said first face.

17. The multilayer synthetic packaging film as defined in claim 9, wherein said absorption layer is light-absorbing in one of the ultraviolet range and the infrared range of the optical spectrum and is transparent in the visible range of the optical spectrum.

18. The multilayer synthetic packaging film as defined in claim 9, wherein said absorption layer contains a pigment which is photochemically bleached under the effect of heat.

* * * * *